(12) United States Patent
Gretz

(10) Patent No.: US 9,531,177 B1
(45) Date of Patent: Dec. 27, 2016

(54) TV BRIDGE KIT

(71) Applicant: Arlington Industries, Inc., Scranton, PA (US)

(72) Inventor: Thomas J. Gretz, Delray Beach, FL (US)

(73) Assignee: Arlington Industries, Inc., Scranton, PA (US)

( * ) Notice: Subject to any disclaimer, the term of this patent is extended or adjusted under 35 U.S.C. 154(b) by 0 days.

(21) Appl. No.: 15/096,688

(22) Filed: Apr. 12, 2016

Related U.S. Application Data

(60) Provisional application No. 62/146,348, filed on Apr. 12, 2015.

(51) Int. Cl.
| | |
|---|---|
| *H01H 9/02* | (2006.01) |
| *H01R 13/502* | (2006.01) |
| *H02G 3/14* | (2006.01) |
| *H05K 5/03* | (2006.01) |
| *H05K 5/00* | (2006.01) |
| *H01H 13/04* | (2006.01) |
| *H01H 19/04* | (2006.01) |
| *H01H 21/04* | (2006.01) |
| *H01H 23/04* | (2006.01) |
| *H01J 15/00* | (2006.01) |
| *H01R 13/46* | (2006.01) |
| *H02G 3/22* | (2006.01) |
| *A47B 97/00* | (2006.01) |
| *H01R 13/405* | (2006.01) |
| *H01R 27/02* | (2006.01) |
| *H02G 3/08* | (2006.01) |

(52) U.S. Cl.
CPC ............... *H02G 3/22* (2013.01); *A47B 97/001* (2013.01); *H01R 13/405* (2013.01); *H01R 27/02* (2013.01); *H02G 3/081* (2013.01)

(58) Field of Classification Search
CPC .......... H01H 9/02; H01H 13/04; H01H 19/04; H01H 21/04; H01H 23/04; H05K 5/03; H05K 5/00; H01R 13/502; H01R 13/46; H02G 3/14; H02G 3/08; H02G 3/04
USPC ..... 439/536, 535, 538, 502; 174/58, 53, 559
See application file for complete search history.

(56) References Cited

U.S. PATENT DOCUMENTS

| | | | | |
|---|---|---|---|---|
| 4,494,815 A * | 1/1985 | Brzostek | ................ | H01R 31/02 174/66 |
| 5,816,848 A * | 10/1998 | Zimmerman | ............ | H02G 3/00 174/69 |
| 7,367,121 B1 * | 5/2008 | Gorman | ............... | H01R 13/652 174/53 |

(Continued)

*Primary Examiner* — Gary Paumen

(57) ABSTRACT

A TV bridge kit including an assembly of components for mounting a TV to a wall while minimizing disruption to the wall surface. The kit includes a first and second frame member with cover plates and an electrical cable having a male and a female plug end. Frame members include rotatable clamp arms to enable rapid installation to existing walls. Cover plates include openings and peripheral walls adapted to receive nose portions of the plug ends. Tabs on the plug ends of the electrical cable enable connection to bosses in the peripheral walls of the cover plates. An outer flange on the frame members enable recessed mounting of the cover plates with the front surface of the plug ends flush with the cover plate. After installation on a wall, the TV bridge kit is powered by connection of a conventional electrical cord from an existing outlet.

16 Claims, 9 Drawing Sheets

(56) References Cited

U.S. PATENT DOCUMENTS

| | | | | |
|---|---|---|---|---|
| 8,563,876 B1* | 10/2013 | Gretz | H01R 13/59 | 174/541 |
| 8,658,895 B1* | 2/2014 | Gretz | H02G 1/00 | 174/53 |
| 8,975,518 B1* | 3/2015 | Gretz | H02G 3/086 | 174/50 |
| 9,263,863 B2* | 2/2016 | DeCosta | H02G 1/00 | |
| 9,318,888 B1* | 4/2016 | Baldwin | H02G 3/386 | |
| 2007/0082544 A1* | 4/2007 | Kidman | H01R 13/447 | 439/536 |
| 2007/0141869 A1* | 6/2007 | McNeely | A61B 5/0006 | 439/76.1 |
| 2012/0031664 A1* | 2/2012 | Nixon-Lane | E06B 7/28 | 174/495 |
| 2013/0056259 A1* | 3/2013 | Lettkeman | H02G 1/00 | 174/505 |

\* cited by examiner

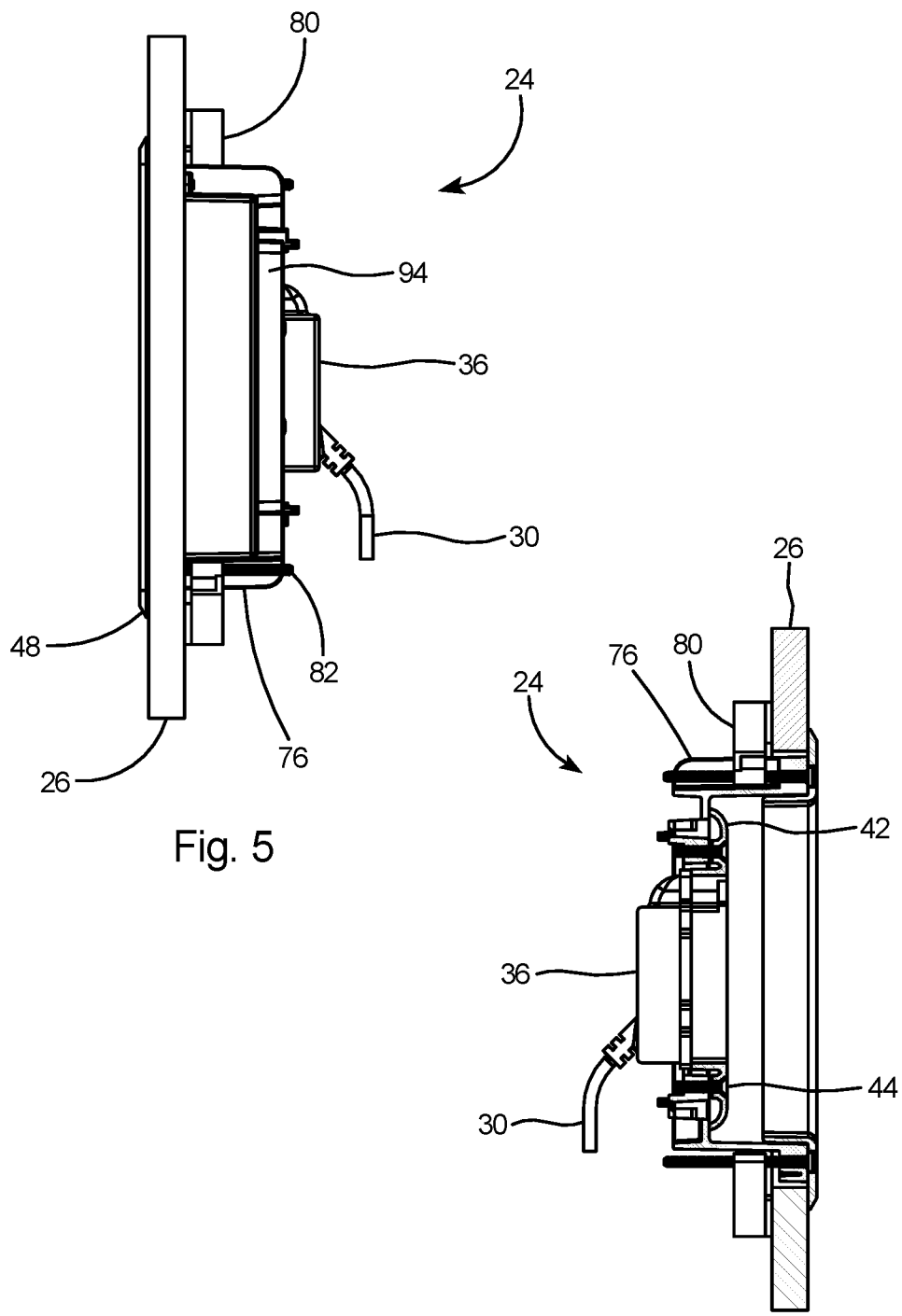

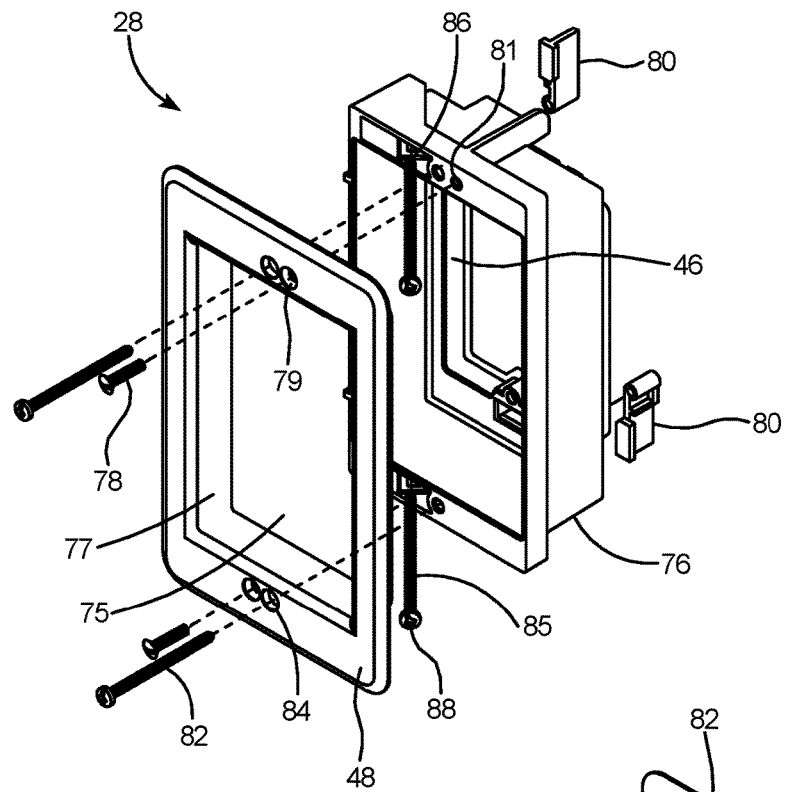
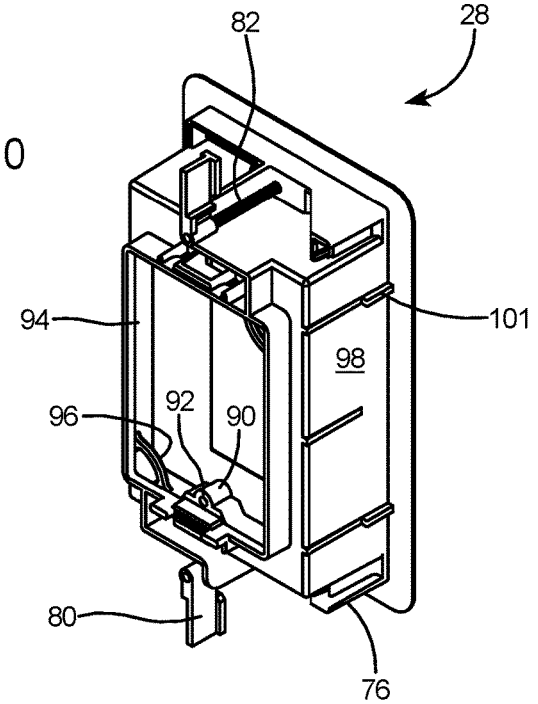
Fig. 10
Fig. 11

TV BRIDGE KIT

CROSS-REFERENCE TO RELATED APPLICATIONS

This application claims priority to provisional U.S. application No. 62/146,348, filed Apr. 12, 2015.

FIELD OF THE INVENTION

This invention relates to the installation of electrical components and specifically to a television (TV) bridge kit that eliminates the need to disturb wall studs and minimizes the amount of time required by an installer to provide electrical service and low voltage connections on a wall for the mounting of a flat panel TV or similar device thereto.

BACKGROUND OF THE INVENTION

It is common for homeowners to mount flat panel televisions and similar electrical devices on a wall. This often requires the installation of a new electrical outlet to provide electrical feed to the device. Installation of the electrical outlet typically required the installer to run electrical feed to the device from some distance away and would require removal of the wall surface, such as wallboard, drilling through the joists, and then pulling electrical cable from an existing outlet to the newly installed outlet.

Although previous versions of the TV bridge kit have been proposed, the kits typically included a pair of electrical boxes which required an installer to perform the time intensive task of running cable between the boxes and completing wire terminations within each box.

What is needed therefore is a TV bridge kit and method for quickly and easily supplying power and low voltage connections to a wall-mounted TV or similar electrical device. The TV bridge kit would eliminate the need for altering the surrounding wall surface and underlying studs, eliminate the need to pull power and low voltage cables through adjacent studs in the wall, and eliminate the need to make extensive repairs to the drywall and wall surface after the cables are installed. The TV bridge kit includes a pre-molded plug with plug ends that eliminates the need for on-site wiring terminations, thus simplifying the installation task and minimizing the time for installing power to a wall-mounted TV. The TV bridge kit also eliminates the need to remove drywall, drill studs, and feed electrical supply cable through the studs in order to power the electrical device.

BRIEF SUMMARY OF THE INVENTION

The invention is a TV bridge kit including a kit, package, or assembly of components for mounting a TV to a wall while eliminating disruption to the visible wall surface. The kit includes a first and second frame member with cover plates and an electrical cable including a male plug end and a female receptacle end. The frame members include rotatable clamp arms to enable rapid installation to existing walls. The cover plates include openings and peripheral walls surrounding the openings. The cover plate openings are adapted to receive nose portions of the plug ends. Tabs on the plug ends of the electrical cable enable connection to bosses in the peripheral walls of the cover plates. An outer flange on the frame members enable recessed mounting of the cover plates with the front surface of the plug ends flush with the cover plate. The TV bridge kit simplifies the task of providing an electrical outlet on a portion of the wall that is remote from an existing outlet. After mounting the frame members to a wall, the electrical cable a conventional electrical cord is simply plugged into an existing outlet in order to feed power from the existing outlet to the installed TV bridge kit and thus to provide power to the female receptacle.

OBJECTS AND ADVANTAGES

The TV bridge kit enables an installer to rapidly and easily provide power to a wall-mounted TV by eliminating the need to remove drywall or disrupt the wall surface surrounding the TV.

The TV bridge kit eliminates the need for making wire terminations when supplying power for a wall-mounted electrical device such as a TV.

The TV bridge kit eliminates the need to alter underlying studs in order to supply electricity to a wall-mounted TV.

The two-gang TV bridge kit eliminates unsightly visible cables surrounding any wall-mounted TV to which it supplies power.

These and other objects and advantages of the present invention will be better understood by reading the following description along with reference to the drawings.

BRIEF DESCRIPTION OF THE SEVERAL VIEWS OF THE DRAWING(S)

Reference is made herein to the accompanying drawings, which are not necessarily drawn to scale, and wherein:

FIG. 5 is a side view of a power ouput device that forms a portion of the TV bridge kit of FIG. 1.

FIG. 6 is a sectional view of the power input device taken along line 6-6 of FIG. 2.

FIG. 10 is a front perspective view of a mounting bracket that forms a portion of the TV bridge kit of FIG. 1.

FIG. 11 is a front perspective view of the mounting bracket.

DETAILED DESCRIPTION

Figure 1:
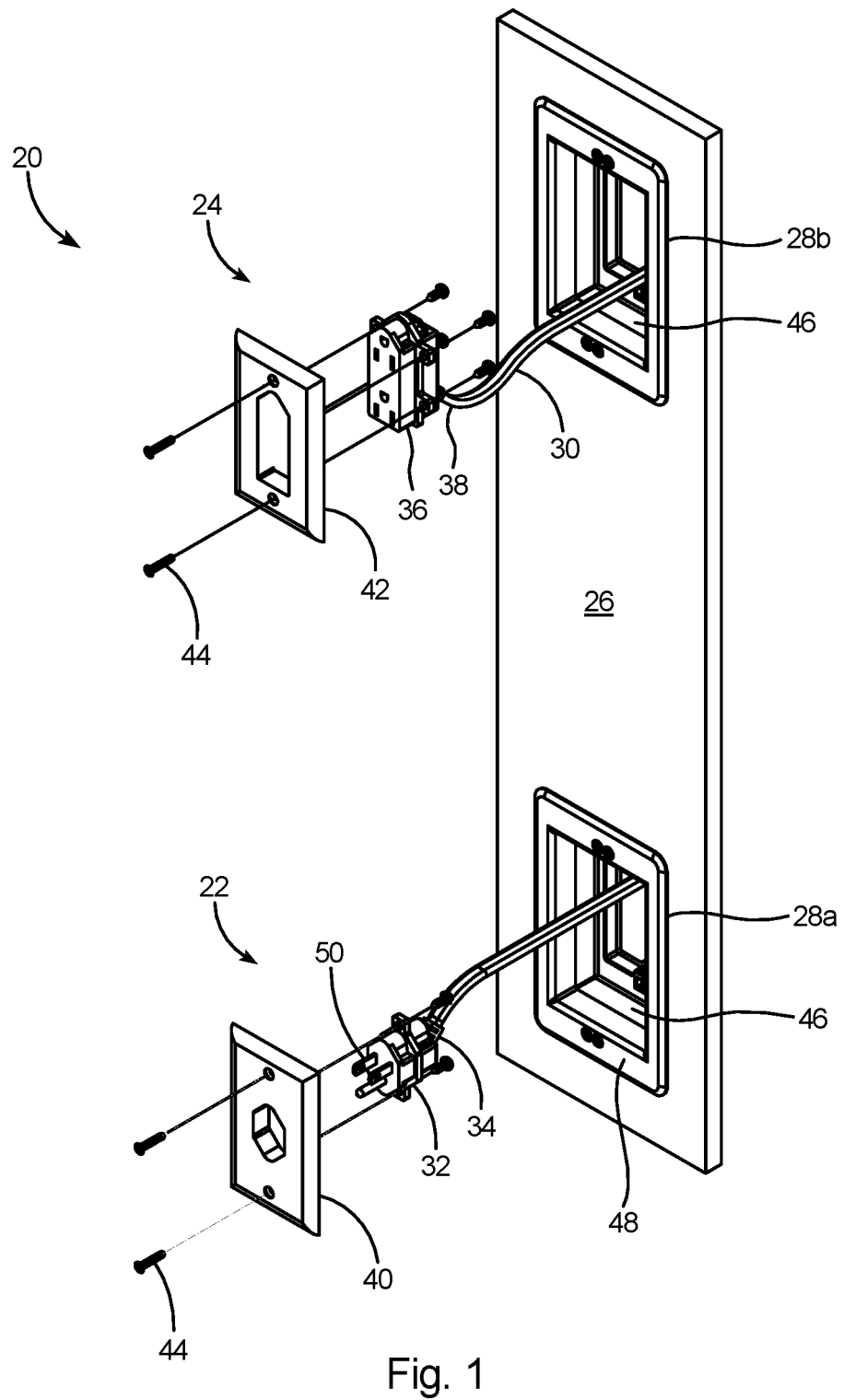
FIG. 1 is a front exploded isometric view of a first and preferred embodiment of a TV bridge kit, in accordance with embodiments of the invention.

With reference to FIG. 1, there is shown a preferred embodiment of a TV bridge kit 20 according to the present invention. The TV bridge kit 20 includes a power input device 22 and a power output device 24 that are each secured to a wall 26 by a mounting bracket 28a and 28b respectively. The power input device and power output device are electrically connected by an electrical cable 30 including a male plug 32 integral with the cable at its input end 34 and a female receptacle 36 integral with the cable at its output end 38. An input cover plate 40 secures the power input device 22 to the input mounting bracket 28a and an output cover plate 42 secures the power output device 24 to the output mounting bracket 28b. Plate fasteners 44 secure the respective cover plates 40 and 42 to a recessed wall 46 that is recessed away from a flange member 48 on the mounting brackets. Male plug 32 includes prongs 50 extending therefrom. TV bridge kit 20 may be used by a homeowner to provide electrical power to a wall location that is remote from an existing wall outlet, such as for mounting a flat panel TV on a wall. The TV bridge kit enables an installer to provide power by simply cutting two holes in the wall to accommodate mounting brackets 28a and 28b, fishing the electrical cable 30 through the wall, assembling each cover plate 40 and 42 to the respective plug 32 and 36, and then securing the cover plates 40 and 42, with attached electrical plugs 32 and 36, to the recessed wall 46 of the respective mounting bracket.

Figure 2:
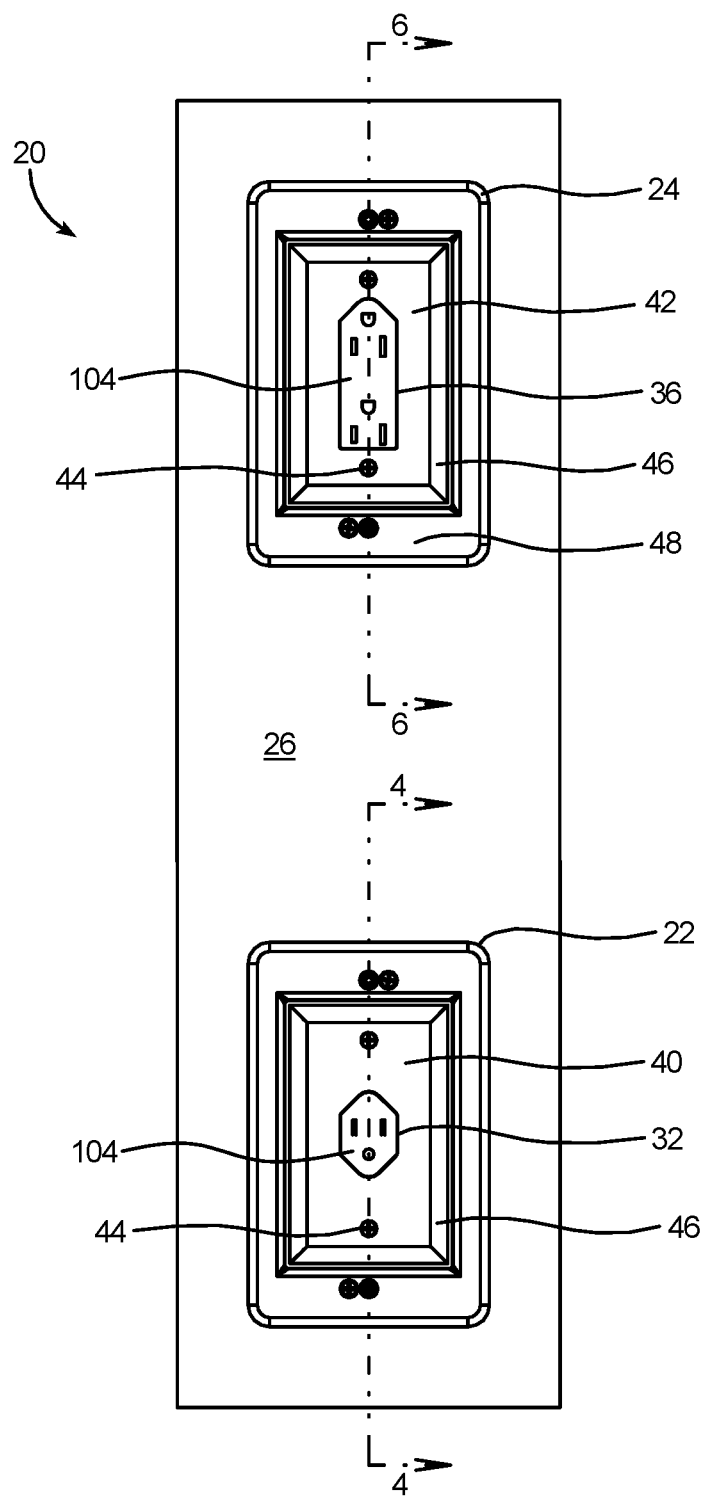
FIG. 2 is a front elevation view of the TV bridge kit of FIG. 1.
Figures 3, 4:
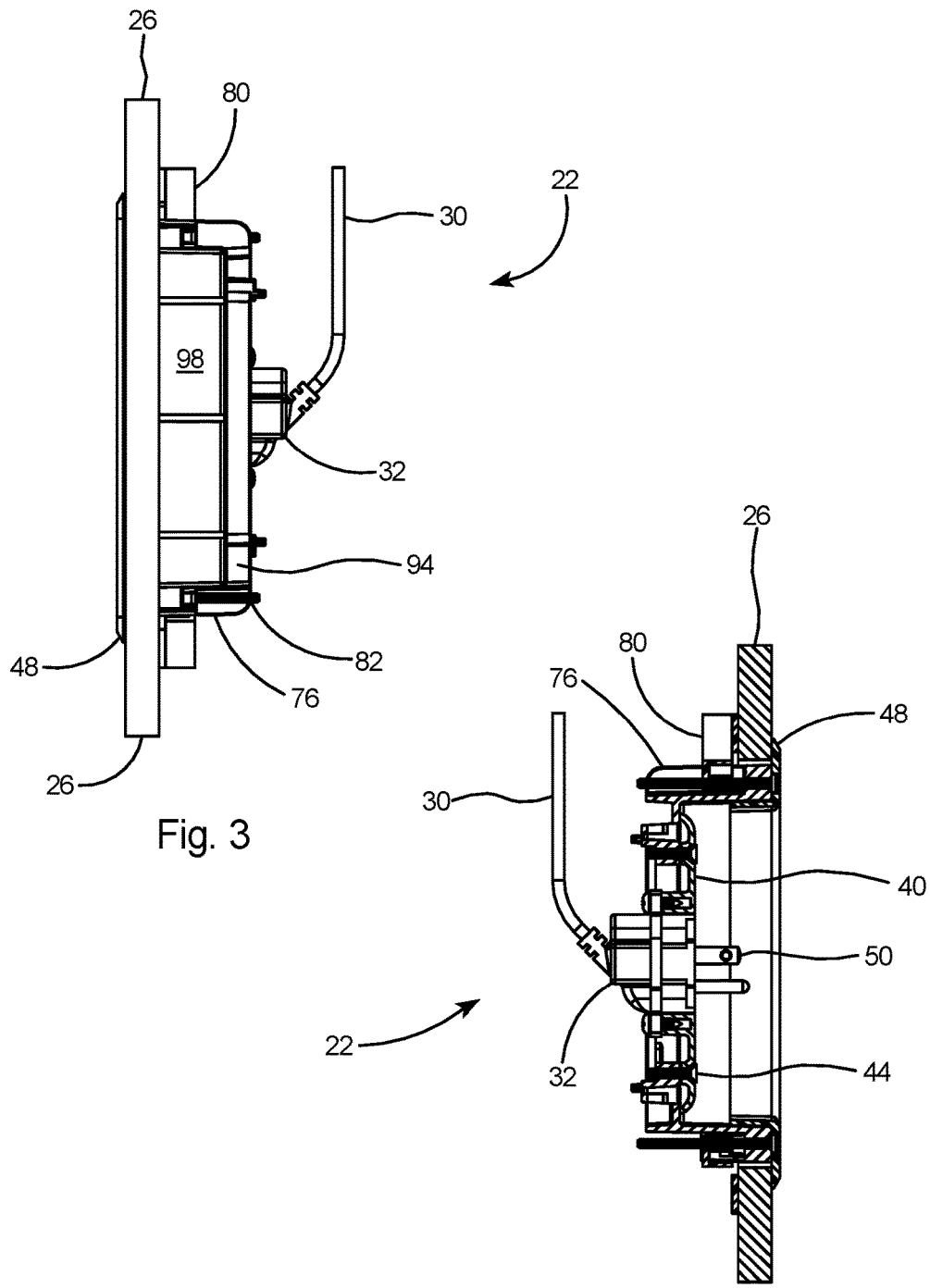
FIG. 3 is a side view of a power input device that forms a portion of the TV bridge kit of FIG. 1.
FIG. 4 is a sectional view of the power input device taken along line 4-4 of FIG. 2.

In the finished installation as shown in FIG. 2, input cover plate 40 is secured to recessed wall 46 of power input device 22 and output cover plate 42 is secured to power output device 24. The male end of a conventional electrical cord (not shown) may be plugged into an existing wall outlet and the female end of the conventional electrical cord plugged onto the male plug 32 of the power input device 24 to energize the newly mounted female receptacle 36.

Figure 13:
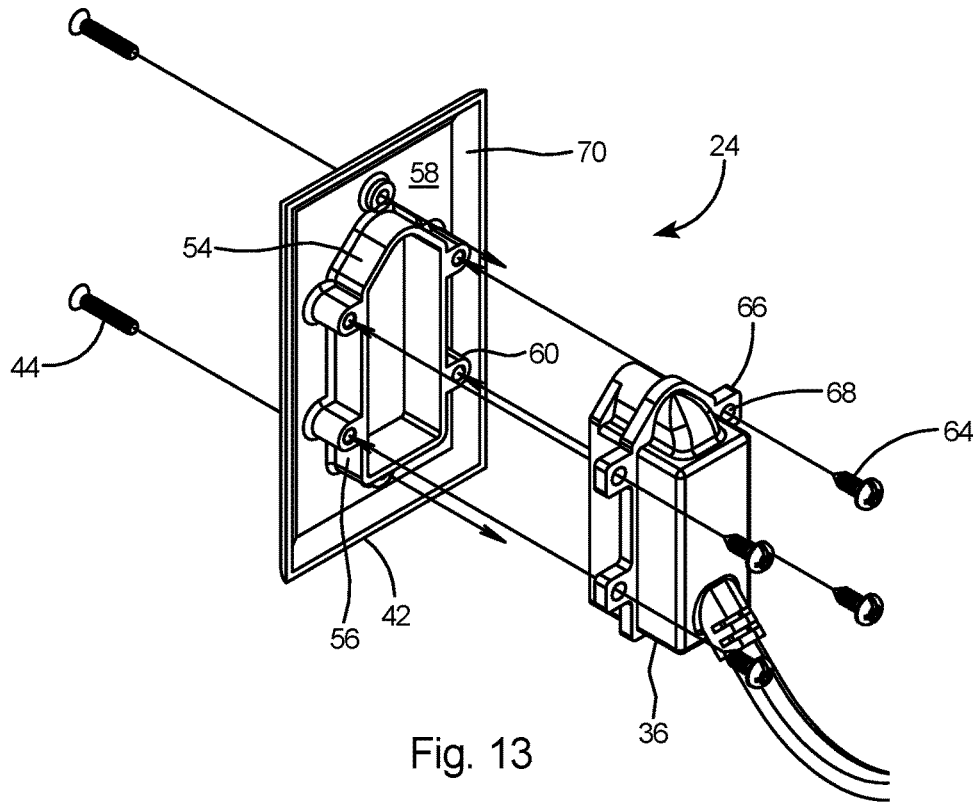
FIG. 13 is a rear exploded isometric view of a power output device, in accordance with embodiments of the invention.
Figure 14:
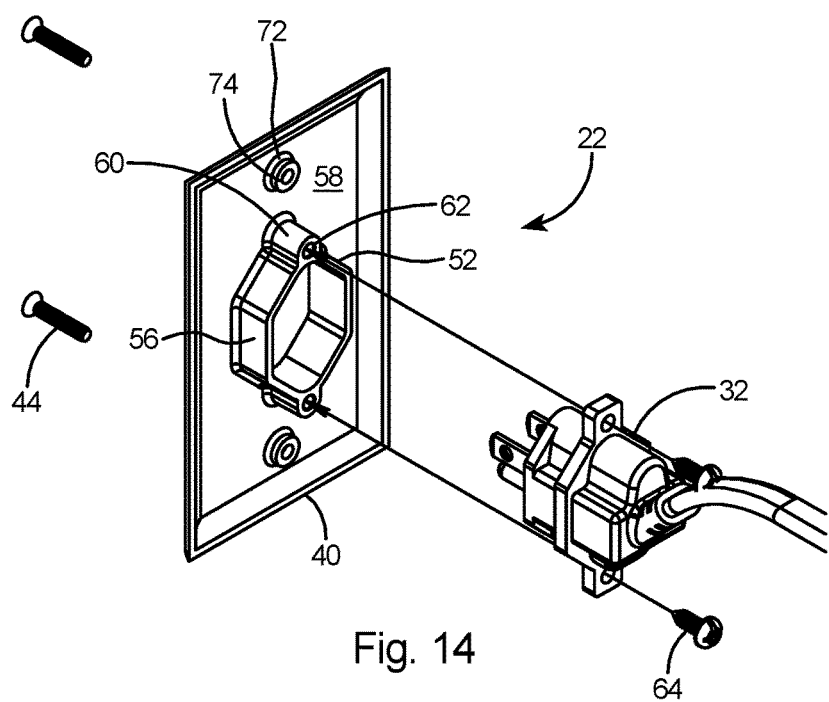
FIG. 14 is a rear exploded isometric view of a power input device, in accordance with embodiments of the invention.

Referring to FIGS. 13 and 14, cover plates 40 and 42 each include a hub 52 and 54 for power input device 22 and power output device 24 respectively. Each hub 52 and 54 includes a peripheral wall 56 extending from the rear surface 58 of the respective cover plate 40 and 42 and one or more bosses 60 integral with the cover plate. Each boss 60 includes a bore 62 therein. Plug fasteners 64 are secured to hubs 52 and 54 respectively to secure male plug 32 and female receptacle 36 respectively to the hubs to form an electrical cable and cover plate assembly 64 including assemblies 22 and 24. Male plug 32 and female receptacle 34 include tabs 66 with apertures 68 therein to facilitate connection to the cover plates 40 and 42. Cover plates 40 and 42 include a perimeter wall 70 that enables the plate to stand off from mounting plate when it is secured thereto. Cover plates 40 and 42 further include plate bosses 72 which extend to a rear face 74 that will fit flush against the mounting plate (see FIG. 1).

With reference to FIGS. 10 and 11, a mounting bracket 28 according to the present invention includes a mounting frame or frame member 76, flange 48, and recessed wall 46 which is recessed within the frame member. Flange 48 includes an opening 75 therein and a peripheral wall 77 that extends rearward from the flange 48. Mounting frame 76 preferably includes the flange 48 integrally attached to frame member 76 with screws 78 through apertures 79 of flange into apertures 81 in frame member 76. Mounting frame 76 further includes one or more clamp arms 80 attached to clamp fasteners 82. The clamp fasteners 82 extend through oversize holes 84 in flange 46 and may be tightened to draw clamp arms 80 against the back side of a wall 26 (see FIG. 1) and thus secure mounting frame to the wall. If preferred, flange 48 of mounting frame 76, as shown in FIG. 10, may be removed to expose secondary attachment means 85 for securing the mounting frame to a wall, the secondary attachment means 85 including an aperture 86 in the frame 76 and a long screw 88 for driving into a stud (not shown) or similar support. Mounting frame 76 further includes one or more bosses 90 with apertures 92 therein for attachment of the cover plates 40 and 42 (see FIG. 1), a rearward-extending collar 94, and a cable tie-off 96. Mounting frame 76 includes sidewalls 98 having one or more rails 101 thereon, which rails are for contact with the exposed portions of a wall in which a hole has been formed for the mounting of the mounting frame, the rails 101 reducing the amount of surface contact between the mounting frame and the wall as it is inserted within the hole. When the flange 48 is secured to the mounting frame 76, peripheral wall 77 of flange 48 nests within the sidewalls 98 of frame member 76.

Figure 12:
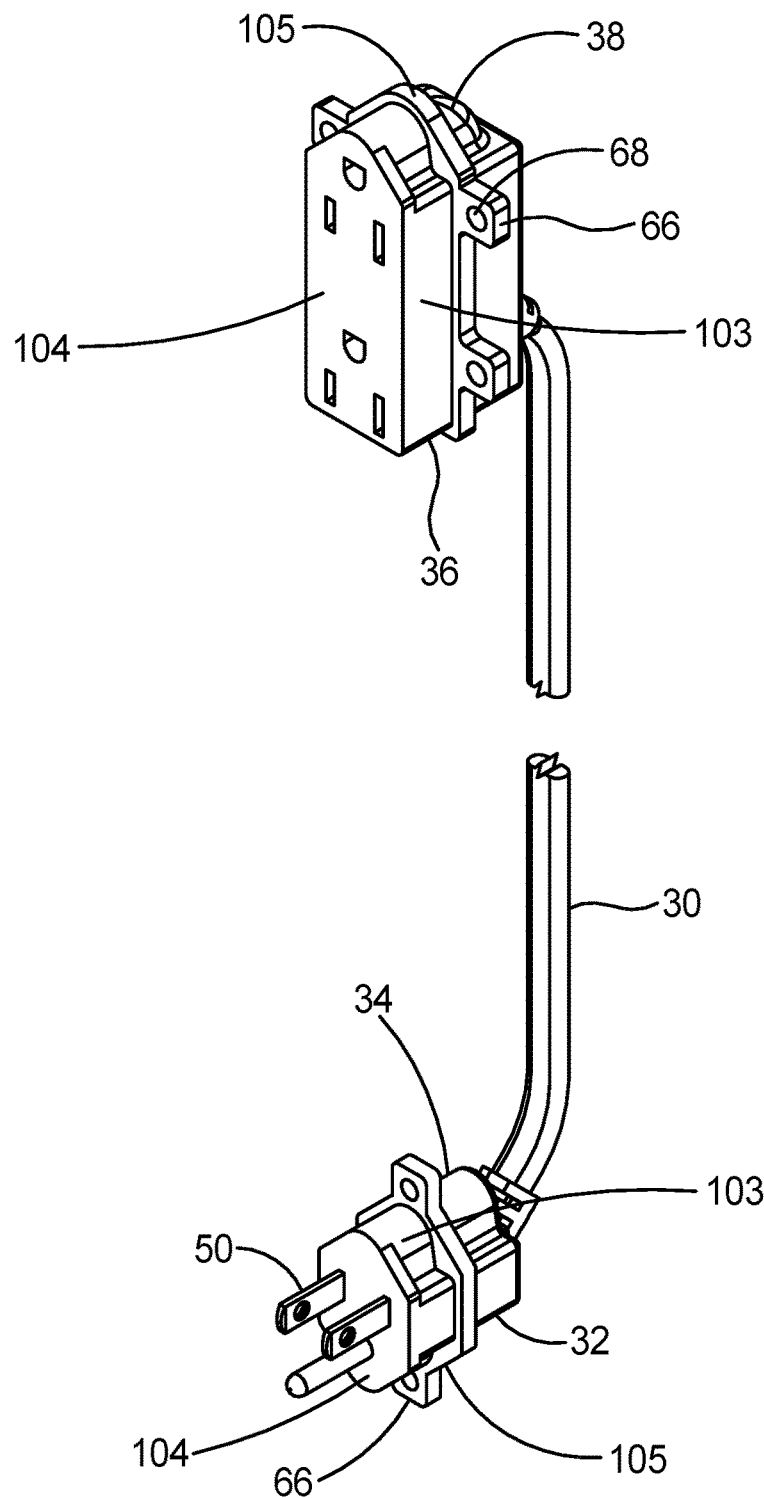
FIG. 12 is a perspective view of an electrical cable that forms a portion of the TV bridge kit of FIG. 1.

Referring to FIG. 12, the electrical cable 30 includes an input end 34 with a male plug 32 and an output end 38 with a female receptacle 36. Preferably the male plug 32 and the female receptacle 36, including the tabs 66 extending laterally there from, are molded integral with the intervening electrical cable 30. The male plug 32 and the female receptacle 36 each include a nose portion 103 with a front face 104 for insertion through a complementary hole in their respective cover plates 40 and 42 (see FIG. 1) and a flange 105 for arresting insertion through the hole and seating on the back surface of the cover plate. As shown in FIG. 2, when secured to the cover plate, front face 104 of the male plug 32 and female receptacle 36 will be flush with their respective cover plate 40 and 42 respectively.

Figure 7:
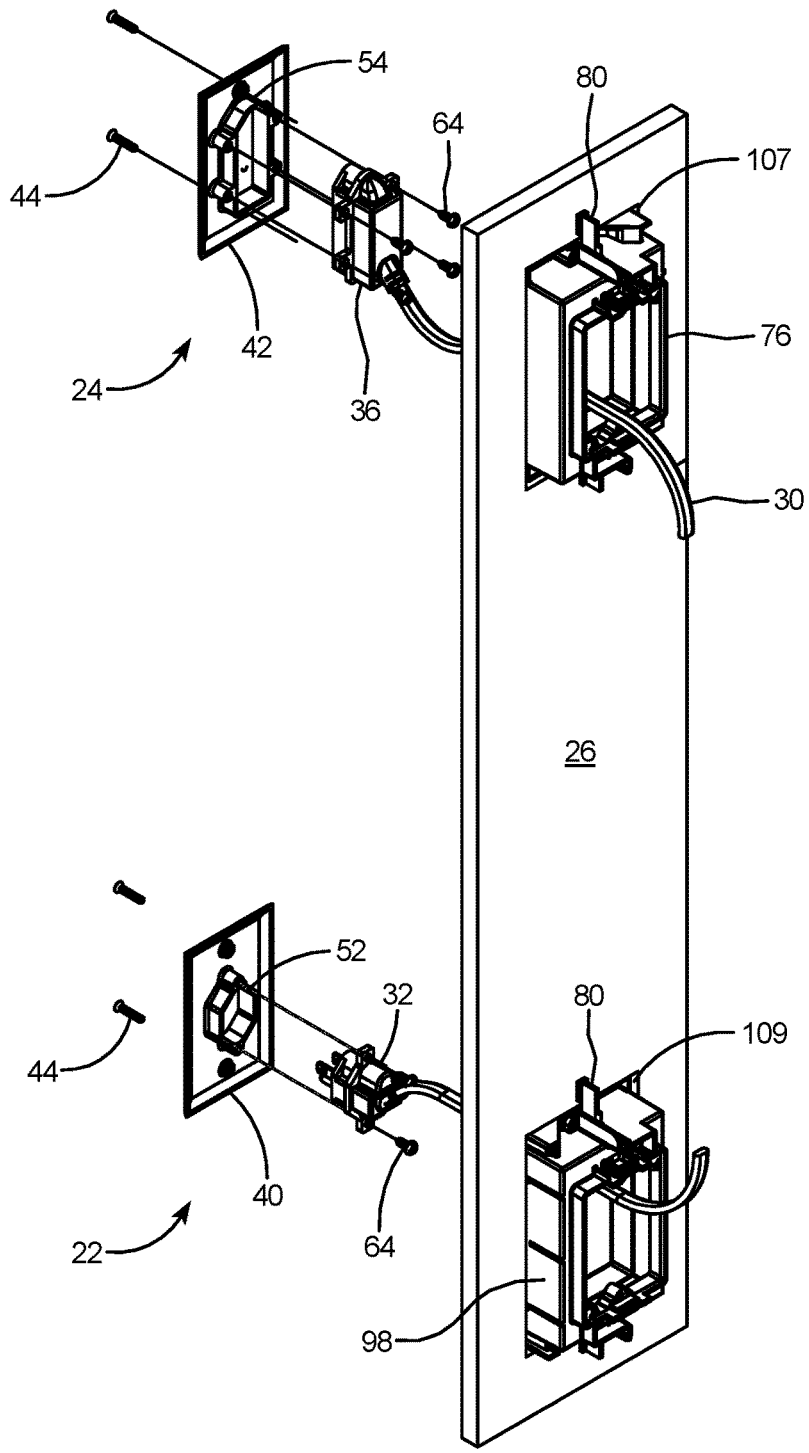
FIG. 7 is a rear exploded isometric view of a TV bridge kit, in accordance with embodiments of the invention.
Figures 8, 9:
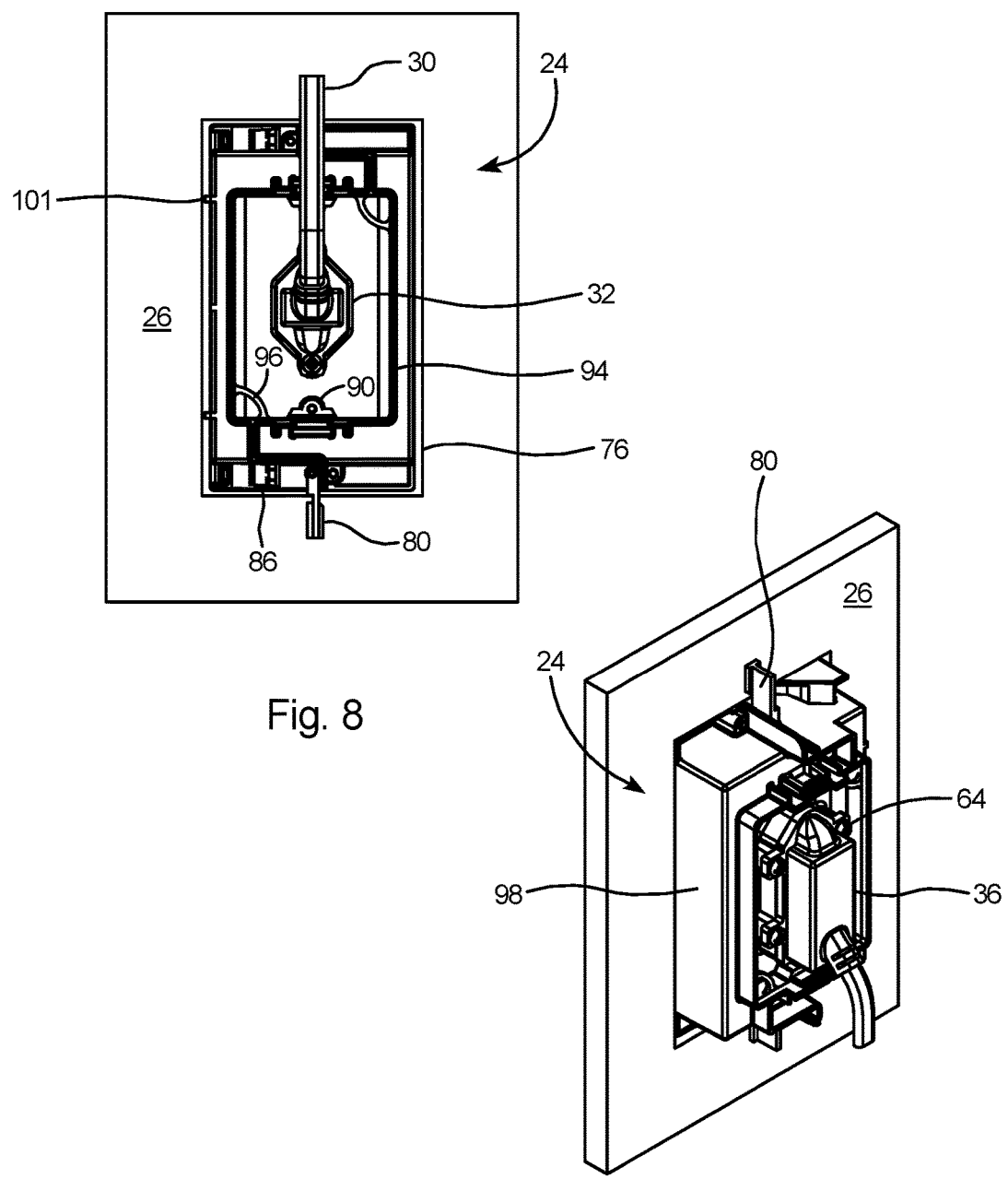
FIG. 8 is a rear elevation view of a power input device according to embodiments of the present invention.
FIG. 9 is a rear isometric view of a power output device according to embodiments of the present invention.

With reference to FIG. 7, the TV bridge kit 20 is operated by cutting an upper hole 107 in the wall 26 at a location desired for mounting a flat panel TV or similar electrical device. A lower hole 109 is preferably cut in a location in vertical alignment and below the upper hole in order to enable routing and easy pulling of the electrical cable 30 behind the wall 26 and between adjacent joists. The male plug end 32 of the electrical cable 30 is preferably placed into the upper hole 107, dropped through the wall cavity, and pulled through the lower opening 109. The sidewalls 98 of each of the mounting frames 76 are then placed over the ends 32 and 36 of the cable and secured to the wall by tightening the clamp fasteners 82 (see FIG. 10), which rotate the clamp arms 80 behind the wall and then secure the frame members 76 to the wall. After frame members 76 are secured to the wall 26 (see FIG. 7), plug fasteners 64 are tightened into bosses 60 on male plug 32 and female receptacle 36 to secure them to their respective cover plates 40 and 42. Plate fasteners 44 are then driven into front apertures 81 of frame members 76 (see FIG. 10) to secure the male plug 32 and input cover plate 40 (see FIG. 14) and the female receptacle 36 and output cover plate 42 to their respective frame members 76. Lastly, a conventional extension cord (not shown), is plugged into an existing outlet and the female end is attached to the prongs 50 of the male plug 32 (see FIG. 1) to feed electrical power to the female receptacle 36 of the newly installed upper electrical box.

Having thus described the invention with reference to a preferred embodiment, it is to be understood that the invention is not so limited by the description herein but is defined as follows by the appended claims. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments herein were chosen and described in order to best explain the principles of the invention and the practical application, and to enable others of ordinary skill in the art to understand the invention.

What is claimed is:

1. A TV bridge kit, comprising:
an upper frame member including a flange, a recessed wall, and an outlet cover plate;
a lower frame member including a flange, a recessed wall, and an input cover plate;
said cover plates each including a rear surface with a peripheral wall and bosses on said peripheral wall;
means for attaching said frame members to a wall;
an electrical cable including a male plug and a female receptacle;
tabs on said male plug for enabling attachment of said male plug to the bosses on said input cover plate; and
tabs on said female receptacle for enabling attachment of said female receptacle to the bosses on said output cover plate.

2. The TV bridge kit of claim 1 wherein
said recessed wall of said frame member includes a front surface; and
said front surface of said recessed wall is parallel to said flange of said frame member.

3. The TV bridge kit of claim 1, further comprising a nose portion on said male plug and a nose portion on said female receptacle.

4. The TV bridge kit of claim 1, further comprising a flange extending laterally from said male plug and a flange extending laterally from said female receptacle.

5. The TV bridge kit of claim 4, wherein said tabs extend from said flange of said male plug and said flange of said female receptacle.

6. The TV bridge kit of claim 5, further comprising:
a front face on said nose portion of said male plug and a front face on said nose portion of said female receptacle; and
a front face on said flange of said male plug and said female receptacle.

7. The TV bridge kit of claim 6 wherein
said front face on said nose portion of said male plug is parallel with said front face of said flange of said male plug; and
said front face on said nose portion of said female receptacle is parallel with said front face of said flange of said female receptacle.

8. The TV bridge kit of claim 1, further comprising:
an opening in said input cover plate, said opening having a periphery;
an opening in said output cover plate, said opening having a periphery; and
a hub on said input cover plate and said output cover plate.

9. The TV bridge kit of claim 8, further comprising:
a rear surface on said cover plates;
said hub of said cover plates including a peripheral wall extending from said rear surface of said cover plates; and
a boss integral with said peripheral wall of said cover plate.

10. The TV bridge kit of claim 1, wherein said means for attaching said frame members to a wall includes
a pair of clamp arms on opposing sides of each said frame member; and
a clamp fastener extending through said front flange of said frame members and engaging said clamp arm.

11. The TV bridge kit of claim 1, wherein said means for attaching said frame members to a wall includes a pair of screws extending through said front flange of said frame members.

12. The TV bridge kit of claim 1, further comprising:
sidewalls on said frame members; and
one or more rails on said sidewalls of said frame members.

13. A TV bridge kit, comprising:
an upper bracket including a frame member, a flange, a recessed wall, and an outlet cover plate;
a lower bracket including a frame member, a flange, a recessed wall, and an input cover plate;
clamp arms on opposing sides of said frame member;
a clamp fastener extending through said front flange of said frame members and engaging said clamp arm;
said cover plates each including a rear surface with a peripheral wall and bosses on said peripheral wall;
an electrical cable including a male end and a female end; and
means for securing said male end to the bosses on said input cover plate and said female end to the bosses on said output cover plate.

14. The TV bridge kit of claim 13, wherein said means for securing said cable ends to said cover plate includes
tabs on said male end and said female end; and
apertures in said tabs.

15. The TV bridge kit of claim 14, wherein said means for securing said cable ends to said cover plate further includes
a peripheral wall on said cover plates; and
a boss in said peripheral wall corresponding to each of said apertures in said tabs of said cable ends.

16. The TV bridge kit of claim 13, further comprising:
a rearward-extending collar; and
a cable tie-off on said a rearward-extending collar.

* * * * *